United States Patent [19]

Louthan

[11] Patent Number: 5,042,770

[45] Date of Patent: Aug. 27, 1991

[54] BEVERAGE CONTAINER HOLDER

[76] Inventor: Connie S. Louthan, P.O. Box 1862, Enid, Okla. 73702

[21] Appl. No.: 583,748

[22] Filed: Sep. 17, 1990

[51] Int. Cl.[5] .......... A47K 1/08

[52] U.S. Cl. .......... 248/311.2; 248/313; 248/205.3; 348/214; 348/231

[58] Field of Search .......... 248/311.2, 310, 313, 248/231, 683, 205.2, 214; 24/306, 442; 128/DIG. 15

[56] References Cited

U.S. PATENT DOCUMENTS

| | | | |
|---|---|---|---|
| 2,632,618 | 3/1953 | Griglak | 248/311.2 |
| 3,212,743 | 10/1965 | Culver | 248/231 X |
| 3,224,644 | 12/1965 | Davis | 248/313 X |
| 3,253,786 | 5/1966 | Parmeloer | 248/311.2 X |
| 3,463,436 | 8/1969 | Foster | 248/231 X |
| 4,310,110 | 1/1982 | Dexter | 24/306 X |
| 4,767,092 | 8/1988 | Weatherly | 248/311.2 |
| 4,934,646 | 1/1990 | Doyle | 248/51 X |

*Primary Examiner*—Alvin C. Chin-Shue
*Attorney, Agent, or Firm*—Robert K. Rhea

[57] ABSTRACT

A beverage receptacle holder is formed by a planar, rigid, rectangular body portion having a generally circular horizontal base portion normal to the plane of the body portion and having a pair of arms, horizontally secured in circular fashion at one end to one surface of the body and terminating in end abutting relation opposite the body and in spaced relation with respect to the container supporting base. The rectangular body portion is provided with a plurality of transverse, horizontally disposed slots and pairs of vertically disposed, horizontally spaced slots between the horizontal slots so that any one or a pair of the several slots may receive elongated strap-like members having hook-and-loop fabric securing material bonded thereto for embracing structural elements or each other and maintaining the beverage holder in an upright position on any one of a plurality of structural elements.

1 Claim, 2 Drawing Sheets

BEVERAGE CONTAINER HOLDER

BACKGROUND OF THE INVENTION

1. Field of the Invention

This invention relates to a support for beverage receptacles and more particularly to a beverage container support which may be cooperatively connected with or mounted on a variety of different objects to maintain a beverage container in upright nonspilling position.

Open beverage container holders have been in common use in automotive vehicles. Such holders have usually comprised a generally upright back or body portion having a forwardly projecting horizontal supporting base and a circular band intermediate the height of the body portion which surrounds the beverage container. The back of the body portion having a horizontal and depending end lip extending opposite the direction of the beverage base and band for engaging the glass window slot of an automotive vehicle.

Such beverage container holders generally have the disadvantage that their supporting features with objects other than an automotive inside the door surface and the fixed position rigid surrounding band, has limited their use to drinking glass sized beverage containers and automotive vehicles.

2. Description of the Prior Art

The most pertinent patent is believed to be U.S. Pat. No. 4,767,092 which discloses a cup retention apparatus having flexible receptacle surrounding arms arranged in end overlapping secured together relation which may be expanded to a limited diameter and in which a flexible support attached to one end of the holder body compensates for the various thicknesses of automotive vehicle doors when mounted at the window position.

This invention is distinctive over this and other similar patents by providing a generally rectangular body or support element of rigid construction generally positioned vertically upright and having a lateral horizontal base or platform normal to the plane of the body.

The unit further includes a pair of generally semicircular arms rigidly connected at one end with the body and projecting in vertically spaced horizontally parallel relation with respect to the base platform and terminating in end-to-end abutting relation. The arms have a memory and when expanded return to the above described position of repose.

Slots in the body receive band fasteners securing the beverage container holder to a plurality of various shaped objects in addition to automotive vehicle inside surfaces.

SUMMARY OF THE INVENTION

An upright, rigid, rectangular, generally planar body is provided at one end with a lateral part-circular base normal to the plane of the body which forms a base or support for a beverage container.

A pair of flexible substantially semicircular arms are cooperatively joined by one end portion in horizontal circular fashion to respective sides of the body, intermediate its length and project laterally in parallel spaced relation with respect to the base.

The body is further characterized by end and intermediate horizontal slots and vertically and horizontally spaced pairs of slots in respective end portions of the body. These several slots, singularly or by pairs, receive respective end portions of band or strap-like fasteners, preferably formed from or including portions of hook-and-eye material, presently marketed under the trademark Velcro, for securing the beverage container holder to a plurality of different sizes and shapes of supports.

The principal object of this invention is to provide a beverage container holder or support which will cooperatively receive a plurality of different diameters or lengths of beverage containers and maintain them in an upright, nonspilling position including accommodating a mug-type cup having a handle and in which the holder may be attached to rods, planar surfaces or a plurality of different shaped objects acting as a stationary base or moving support for the holder.

DESCRIPTION OF THE PREFERRED EMBODIMENTS

Figure 2:
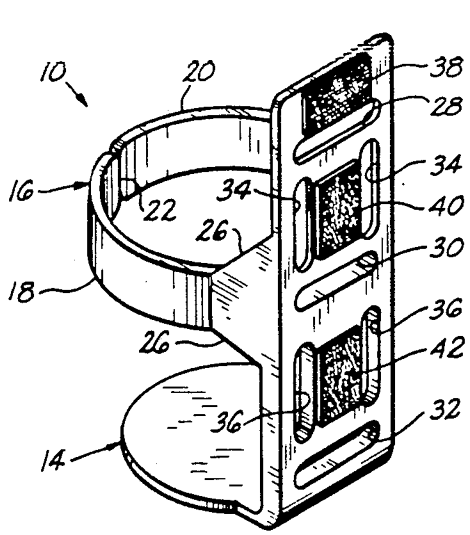
FIG. 2 is a perspective view from a different view point, including sections of hook-and-eye (Velcro) fastening material secured to the back surface of the holder.

Like characters of reference designate like parts in those figures of the drawings in which they occur.

Figure 1:
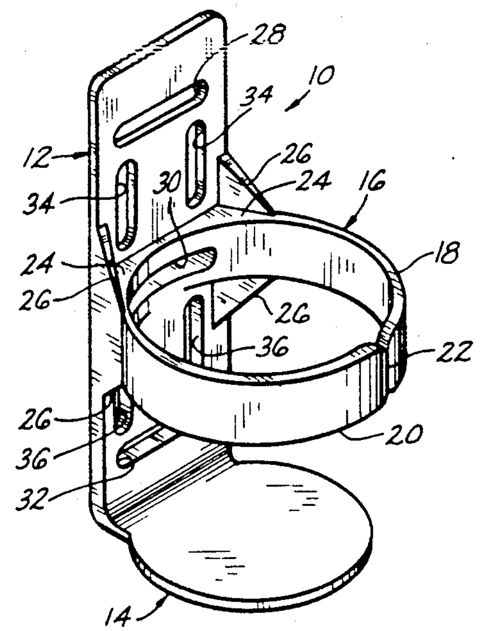
FIG. 1 is a perspective view of the holder, per se.

In the drawings:

Referring first to FIGS. 1 and 2, the reference numeral 10 indicates the holder as a whole comprising a longitudinally upright rigid rectangular body 12 having a part-circular base or support 14 projecting laterally from one end normal to the plane of the body and a pair of arm means 16.

The arm means 16 comprises a pair of flexible band-like generally semicircular arms 18 and 20 rigidly secured at one end portion to the body and having their respective free end edges disposed in end abutting relation normal to the plane of the body 12 as indicated by the line 22. The fixed end portions of the arms are integrally joined rigidly to the forward surface of the body 12 and are braced by horizontal gussets 24 to strengthen their inner surface connection with the body.

Additionally, vertical gussets 26 rigidly interconnect the outer surface of the body and the respective arms to prevent separation of the arm end portions connected with the body.

That end portion of the body between its connection with the arms 18 and 20 and its connection with the circular base 14 is substantially thicker than the upper end portion of the body above the position of the arm means 16, to provide sufficient rigidity for holding beverage containers as hereafter explained.

The body 12 is further characterized by vertically spaced top, medial and lower end portion horizontal slots 28, 30 and 32 extending between respective side edges of the body. Additionally, the body 12 is provided with vertical and horizontally spaced pairs of vertical slots 34 and 36. The respective slot of the pair of slots 34 is disposed between the respective end portions of the horizontal slots 28 and 30, and similarly, the respective slot of the pair of slots 36 is disposed between the respective end portions of the horizontal slots 30 and 32.

The purpose of the slots 28–32 is to receive elongated strap-like fastening members securing the holder 10 to a variety of different shaped objects as desired as will presently be explained.

The surface or back of the body, opposite the arm means 16 and base 14, is provided with a plurality, three in the example shown, of one layer each of rectangular sections 38, 40 and 42 of strap-like fastening fabric, such as the hook-and-eye fastener fabric presently marketed under the trademark Velcro.

The Velcro pad 38 is disposed between the top end of the body and the upper slot 28; the pad 40 between the two horizontal slots 28 and 30 and the pair of vertical slots 34; and, the pad 42 between the horizontal slots 30 and 32 and the pair of vertical slots 36.

Figure 4:
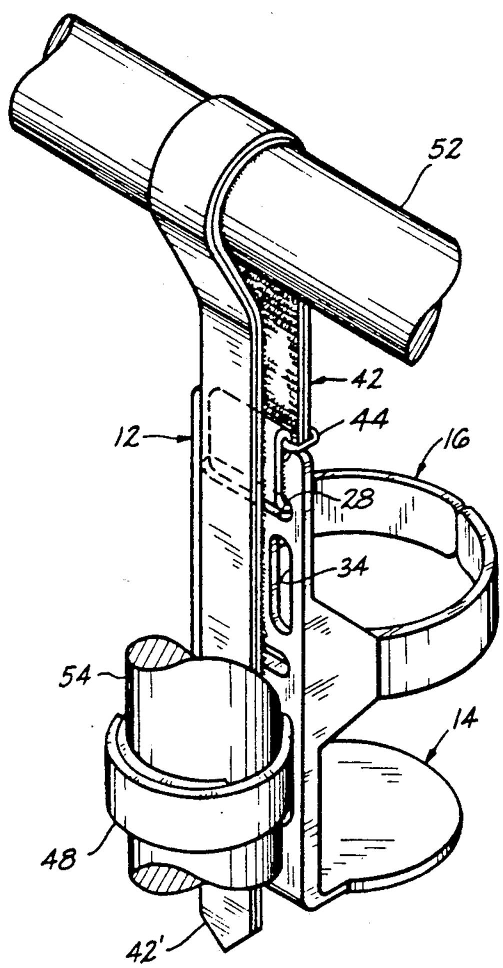
FIG. 4 is a perspective view, similar to FIG. 3, illustrating the holder attached to a horizontal and a vertical support.
Figure 3:
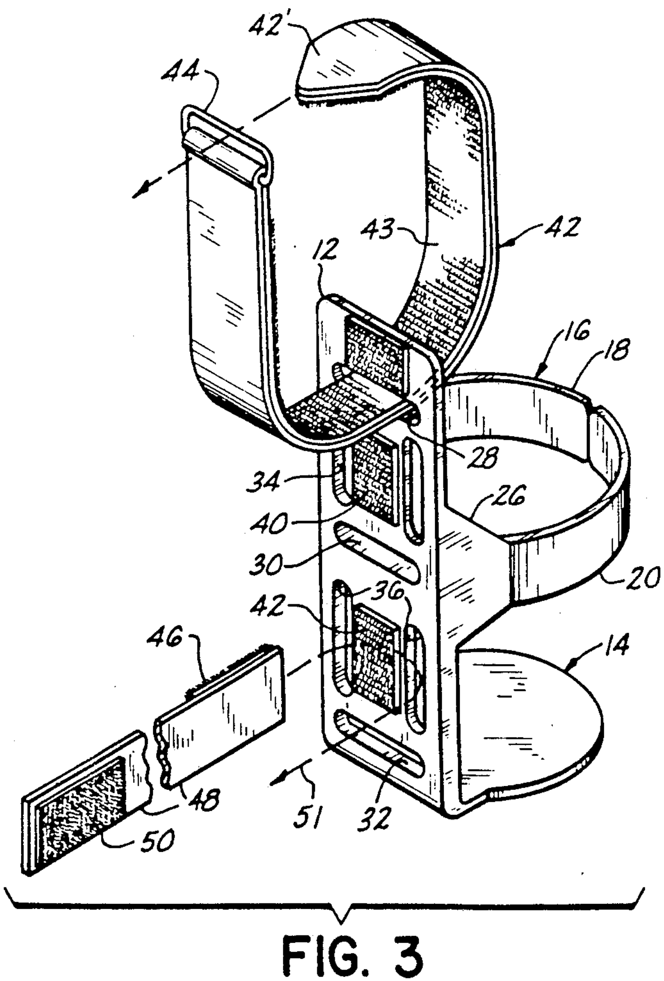
FIG. 3 is a perspective view, similar to FIG. 2, illustrating one manner of connecting strap fasteners with the holder.

Referring now to FIGS. 3 and 4, an elongated strap 42 having Velcro material 43 on one surface is longitudinally inserted by one end portion 42' into the horizontal slot 28 from the rearward surface of the body 12. The opposite end portion of the strap 44 is secured to an endless loop 44 so that the free end portion 42' of the strap may be inserted through the loop 44 and the strap drawn or pulled taut to form a loop closely surrounding that end portion of the body between the slot 28 and the adjacent end of the body.

Similarly, an elongated length of strap material 48 having a section of Velcro material 46 on one surface at one of its ends and also provided with a similar length of Velcro material 50 on the opposite side and end portion of the strap is horizontally threaded through the pair of vertical slots 36 in the direction of the arrow 51 until respective end portions of the strap 48 project rearwardly from the body 12 substantially equidistant.

This arrangement of the straps 42 and 48 permits the holder 10 to be secured to a horizontal bar or rod 52, such as a hand rail, top bar on a wheel chair or any other like object and the strap end portion 42' extended longitudinally of the body 12 so that the Velcro material 43 engages both of the pads 40 and 42, as well as the Velcro material contacting itself adjacent the depending limit of the horizontal rod or bar 52.

Similarly, the strap 48 may be extended or wrapped in wrap-around-fashion, around a vertical bar or tube 54 so that when the respective Velcro sections 46 and 50 are overlapped upon each other, as viewed in FIG. 4, the depending end portion or base 14 of the holder is maintained against lateral movement in any direction.

Figure 6:
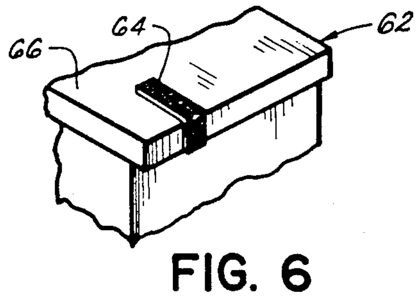
FIG. 6 is a fragmentary perspective view, illustrating the counter top prepared for receiving the holder of FIG. 5.
Figure 5:
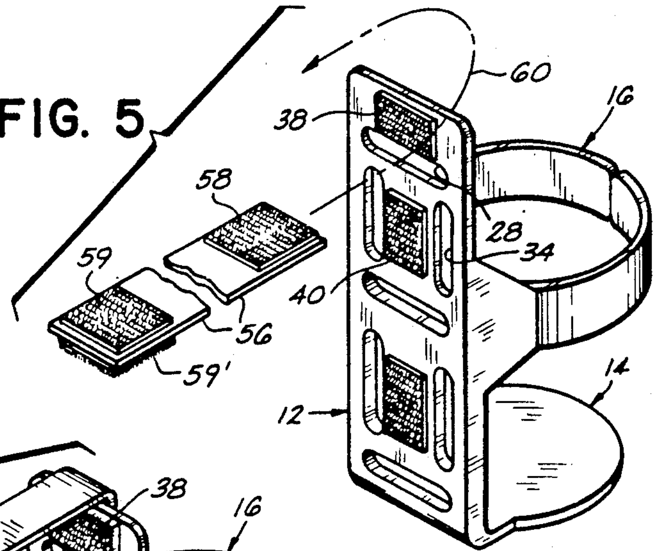
FIG. 5 is another perspective view of the holder, illustrating another manner of connecting a strap fastener to the holder for mounting it on a desk or counter top.
Figure 7:
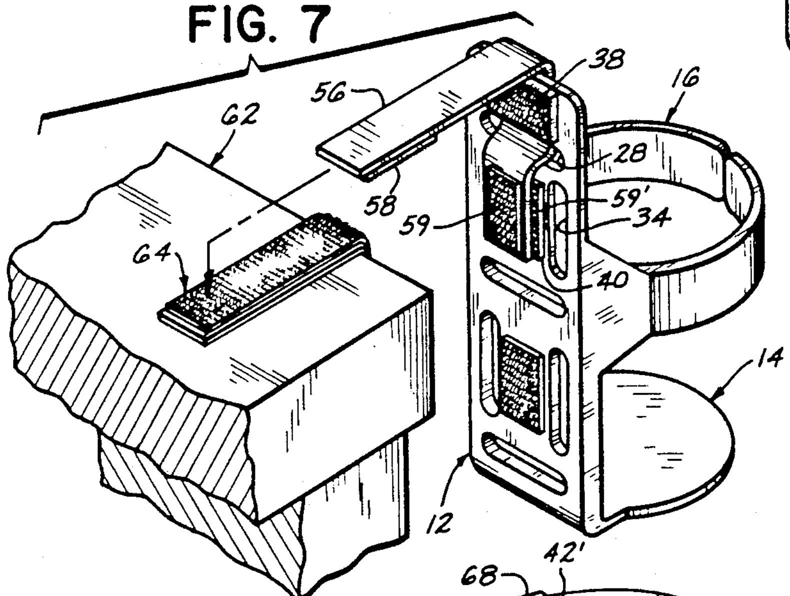
FIG. 7 is an exploded perspective view of the holder and the manner of connecting it to the desk or counter top of FIG. 6; and, FIG. 8 is a perspective view, illustrating the manner of connecting a strap fastener to the holder to be supported from the window opening of an automotive vehicle door.

Referring also to FIGS. 5, 6 and 7, a length of strap material 56 having Velcro pads 58 and 59 at its respective ends on the same surface and a pad 59' opposite the pad 59 is extended through the horizontal slot 28 in the direction of the arrow 60 for supporting the holder 10 on a cabinet or counter top, fragmentarily indicated at 62 (FIG. 7). A length of Velcro material 64 is previously adhered to the counter top 66 and extended over the vertical edge thereof as shown. This permits the leading end portion of the strap 56 (having the attached Velcro 58) to overlie and adhere to the Velcro material 64. The depending end portion of the strap 56 containing the other lengths of Velcro material 59 and 59' contacts the vertical edge portion of the counter mounted Velcro 64 and the body pad 40 to anchor the holder.

Figure 8:
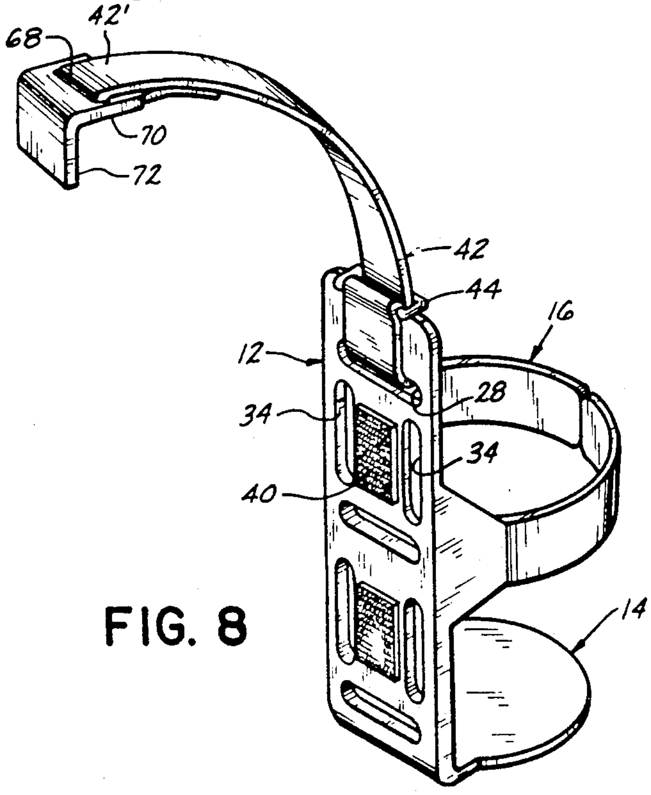

Referring also to FIG. 8, the strap member 42 may be similarly inserted through the slot 28 in the manner shown by FIG. 3 and the free end portion 42' of the strap secured with a loop 68 in one leg 70 of a angle member having its other leg 72 normal to the leg 70.

The angle member end portion 72 is cooperatively received within a vehicle door window slot adjacent the window glass thereof, not shown, wherein the Velcro material 43 extending downwardly along the inner surface of the door securely engages fabric of the door surface to maintain the holder 10 in upright drink non-spilling relation.

Obviously, other Velcro equipped straps may be inserted through the other horizontal slots 30 and 32 or the top pair of vertical slots 34 in a similar manner to that described thereinabove for connecting the holder 10 to a variety of other objects in accordance with the configuration of the structural components. For example, one of the holders and its strap 42, as illustrated and described hereinabove for FIG. 3, may be used with an identical companion member in which the straps 42 may be a single strap or dual straps overlying a console, not shown, between passengers in the forward seats of an automobile for holding drink containers on either side of the console.

Obviously the invention is susceptible to changes or alterations without defeating its practicability. Therefore, I do not wish to be confined to the preferred embodiment shown in the drawings and described herein.

I claim:

1. A drink receptacle holder for supporting cylindrical containers, tapered cups and cups with handles on a stationary or movable support, comprising:
   - a rectangular rigid body normally disposed longitudinally upright having front and back generally planar surfaces and having a plurality of slots spaced vertically and horizontally with respect to each other and the respective edges of the body;
   - a forwardly projecting container supporting base at the depending end of said body normal to the plane thereof;
   - arm means comprising a pair of cooperating substantially semicircular outwardly flexible vertically disposed edgewise band-like arms integrally secured horizontally by one end portion of each arm of said pair of arms to the respective longitudinal front side surface medial the length of said body;
   - horizontal gussets extending between the upper and lower edges of said arms and the forward surface of said body;
   - forwardly diverging upper and lower pairs of vertical gussets integrally connecting a circumferential arc of said arm end portion of each arm of said pair of arms with the respective adjacent vertical side edge portion of said body, the other end of each arm of said pair of arms abutting each other when in a position of repose; and,
   - elongated strap-like means having self-adhesive material on at least one of its longitudinal surfaces longitudinally extending through one or more body slots for attaching said holder to a rigid support.

* * * * *